Figure 1:
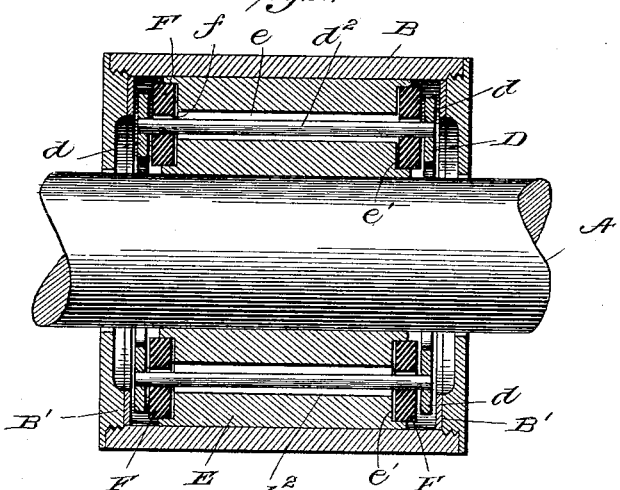

No. 664,822. Patented Dec. 25, 1900.
J. A. PERKINS.
ANTIFRICTION ROLLER BEARING.
(Application filed Dec. 4, 1899.)

(No Model.)

Witnesses:
J. C. Shaw
Walter C. King

Inventor:
Julius A. Perkins
by Crosby Gregory
atty's

THE NORRIS PETERS CO., PHOTO-LITHO., WASHINGTON, D. C.

United States Patent Office.

JULIUS A. PERKINS, OF OMAHA, NEBRASKA, ASSIGNOR TO THE MOFFETT BEARING COMPANY, OF COUNCIL BLUFFS, IOWA.

ANTIFRICTION ROLLER-BEARING.

SPECIFICATION forming part of Letters Patent No. 664,822, dated December 25, 1900.

Application filed December 4, 1899. Serial No. 739,087. (No model.)

*To all whom it may concern:*

Be it known that I, JULIUS A. PERKINS, a citizen of the United States, residing at Omaha, in the county of Douglas and State of Nebraska, have invented an Improvement in Antifriction Roller-Bearings, of which the following description, in connection with the accompanying drawings, is a specification, like characters on the drawings representing like parts.

The invention to be herein described relates to roller-bearings of that type in which a series of bearing-rollers are contained in a rigid traveling cage, the cage being controlled as to its sliding movement upon the journal or shaft by means of traveling-cage controllers.

In the form in which I have herein chosen to illustrate my invention the cage is composed of end walls united rigidly and firmly by cross-bars, the latter separating the cage into roller-receiving spaces, the end walls of the cage having a lined holes which receive a series of supports which are fixed with relation to the cage, the supports constituting centering or spacing means for the rollers.

Heretofore bearing-rollers have been alined and centered in rigid cages by means of spindles having their ends inserted in pits formed at the inner faces of the end walls of the cage, and the bearing-rollers have been chambered at their ends and balls have been inserted in said chambers, the balls contacting with the inner sides of the end walls of the cage and also with the spindles. In a bearing of this kind that it may be thoroughly efficient the balls must not only be exactly spherical, but of exactly the same size, and to enable them to stand up under the wear to which they are subjected they must be thoroughly hardened, and a bearing such as referred to is therefore very expensive to produce, and at the same time its production requires great care, and in a bearing of this sort a ball may have a flaw and the flaw not be discoverable from any usual examination; but the ball when subjected to use will break, thus destroying the efficiency of the bearing.

There are many devices or machines in which roller-bearings may be used to great efficiency, and in many of these machines where the strain to which the bearing is subjected is not as excessive as in railway-work I have devised an antifriction-bearing to take the place of the balls, said bearing being represented as composed of washers of antifriction material which are secured in working position at the ends of the bearing-rollers, said antifriction-washers possessing great durability and enabling the production of a roller-bearing in which the bearing-rollers may be maintained from contact at their ends with the inner walls of the cage and also with the supports for the rollers by a single device which may be more readily applied in working position than the series of balls and which when applied to the ends of the bearing-rollers will remain in such position even though the bearing-rollers be removed from the cage. The bearing-rollers in my invention are composed of metal, as they must be in order to possess the proper amount of durability to run for any considerable length of time, and said rollers are preferably chambered at their ends, and the axial center of each roller may also be provided with a bore which receives a support sustained rigidly in the end walls of the cage, so that said support cannot rotate with the rollers as they rotate about the supports in the traveling movement of the cage, and the bores made in the bottoms of the chambers or countersinks and at the center of rotation of the rollers are of enough larger diameter than the supports that the rollers in their rotation about their supports never under any condition touch the supports.

My improved antifriction bearing or washer will be applied to each roller, and one such washer may be applied in each chamber at the opposite ends of the rollers, the diameters of said washers being sufficient to contact substantially snugly with the inner walls of the flanges, and the washers are of a thickness to extend, preferably, a little beyond the ends of the rollers, and the washers have in them a central opening of smaller diameter than the center bore of the roller, and the diameter of the central opening in the washer is also a little larger than the diameter of the support for the roller, which is surrounded by the washer. A washer so applied to the ends of the roller rotates with the roller, and in the operation of the roller-bearing any sliding movement of a bearing-roller toward the inner side of the cage causes the washer at that end of the roller to meet the inner side of the cage and prevent the end of the roller from contacting with the cage, and so, also, said washer prevents contact of said roller with said support.

The different features of my invention will be hereinafter fully described in the specification and defined in the claims at the end thereof.

Figure 3:
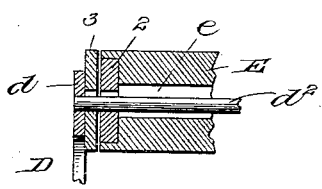
Figure 2:
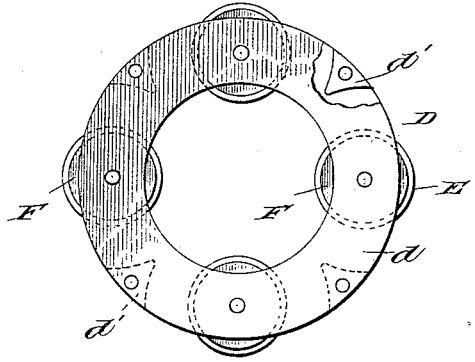
Figure 4:
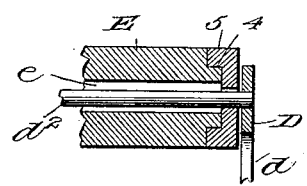
Figure 5:
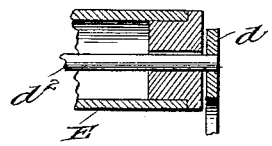

Figure 1 of the drawings represents a series of bearing-rollers having antifriction-washers representing my invention in one good form applied thereto, said rollers being sustained in a cage, the cage surrounding a journal, the cage being in turn surrounded by a box. Fig. 2 is an end view of a cage removed from the box and journal, a portion of one wall of the cage being broken out to better illustrate my invention. Figs. 3, 4, and 5 represent modifications of my invention, showing different ways of applying the antifriction-washer to prevent the contact of the ends of the roller with the cage and with the supports for the said rollers.

Referring to the drawings, A represents a journal or shaft, B a box, and B′ the traveling cage controllers.

In the form in which I have herein chosen to illustrate my invention the journal or shaft may be considered as stationary and the box as capable of being rotated, and the traveling-cage controllers are so represented as connected with and so as to form a part of the box.

The traveling alining-cage D is represented as composed of end walls $d$ $d$, represented as rings firmly and rigidly connected one with the other by suitable arms or bars $d'$, thus forming in the cage a series of spaces, and the walls of the cage between these arms are bored through and through, the holes formed by the bores being alined, and in these alined holes I place a series of supports $d^2$, they presenting roller-alining means extended inwardly from the inner walls of the end pieces of the cage, said supports being fixed in the ends of and restrained from axial rotation in said cage. In a preferred form of my invention the supports are extended from one to the other end of the cage and through the end walls of the cage, and these supports are represented as extended through center bores $e$ of the bearing-rollers E, each of said rollers being composed, preferably, of steel, and, as represented in Figs. 1 and 2, said rollers are chambered or countersunk at $e'$ at their opposite ends. The bores $e$ in the rollers are sufficiently larger in diameter than the diameters of the supports $d^2$ that there will be left a free open running space between the interior of the bores and the exterior of the supports. Now to provide the bearing-rollers with antifriction means readily detachable therefrom when desired I employ washers F, composed of antifriction material, a material differing from the metal used in the roller and also in the cage, said material being preferably of vulcanite fiber or a non-metallic material of the same general character and which may be subjected without lubrication to long wear and yet remain intact. It will, however, be understood that while preferring vulcanite I may obtain excellent results by employing washers composed of metal such as commonly used and interposed to constitute an antifriction-surface between metals of like character; but the vulcanite is preferable from its greater durability and its less weight and cost and because it will wear longer than any metal now known to me. The washers F may be applied, as in Figs. 1 and 2, to the ends of the bearing-rollers, so that the ends of said rollers may not contact with the inner side walls of the cage, and preferably the length of the bearing-rollers with the washers applied to their ends, measured in the direction of their length and including the washers, will be a little greater than the distance between the inner side walls of the cage, so that said bearing-rollers may revolve with the traveling cage under favorable circumstances without the washers contacting with the inner walls of the cage. One good and preferred way of applying these washers is to insert them in the chambers or countersinks at the ends of the rollers, the peripheries of the washers so inserted being of such diameter with relation to the diameters of the chambers or countersinks in the ends of the rollers that the washers when inserted in said chambers or countersinks may be maintained therein, so that the washers will revolve with the rollers. The washers have central openings $f$, which are a little larger in diameter than the diameter of the supports entering said opening, so that but one side of said center opening may touch one side, usually the upper side, of the support, the contact being due to the weight of the cage sustaining the supports. The central openings $f$ in the washers are, however, of less diameter than the central bores at the ends of the bearing-rollers, so that a portion of the washers surrounding the supports may occupy a smaller circle than the circle of the axial bore in the rollers, so that the bores in the rollers may under no circumstances contact with the supports, the washer acting always to prevent such contact. The rigid traveling alining-cage thus above described and having a plurality of bearing-rollers provided with antifriction-washers is interposed between the exterior of the shaft or journal and the interior of the box, and the traveling-cage controllers are located when the said cage is in its operative position outside of and separated from the ends of the cage for preferably a sufficient distance in excess of the length of the cage, measured in the direction of the length of the bearing-rollers, to afford ample clearance between the ends of the cage and the said traveling-cage controlling surfaces, and to make the apparatus herein described yet more efficient and durable and practically indestructible and capable of withstanding long usage without perceptible wear I may and shall interpose between the traveling-cage controllers and the end of the cage antifriction-washers, which may be composed of a material named for use in the description of the washers applied to the ends of the rollers, and there will be left between the ends of the traveling alining-cage and the faces of said washers applied to the traveling-cage controllers a sufficient space to always provide for a defined amount of end motion of the cage between the journal and the box. When for any reason, as in case the surfaces of the journal and box get out of true horizontal position, the cage slides, said cage in its sliding movement meets one or the other of the washers movable with the traveling-cage controlling surfaces, and owing to the fact that the traveling-cage controllers and their washers rotate at a greater rate of speed than the cage a quick blow is given to the cage, which returns it into its free running position between the faces of the washers traveling with the cage-controllers.

I believe that I am the first to ever provide a bearing-roller in a roller-bearing with a washer applied to the end of the roller to contact with the cage and prevent the contact of the bearing-roller with the cage, said washer in the operation of the bearing contacting with the cage at intervals, according to the conditions of use of the traveling alining-cage containing the bearing-rollers, and consequently this invention is not limited to the specific construction represented in the drawings of the washers nor to the particular means of retaining or applying the washer to the ends of the rollers.

Referring to Fig. 1, it will be seen that the washer applied to the chamber in the end of the roller is of a thickness to extend beyond the end of the roller to thus prevent the contact of the end of the roller with the cage, and preferably this form of washer will be used; but the object of my invention would be attained if instead of having one washer I should employ at the opposite ends of the rollers two washers 2 3, as represented in Fig. 3, the washer 2 entering the chamber, the washer 3 being applied between the washer 2 and the inner side wall of the cage, both washers surrounding the support. So, also, in Fig. 4 the ends of the roller may be reduced, as at 4, and a washer 5 be applied to the reduced end of the roller, said washer contacting at its outer face at desired times with the inner side of the end wall of the cage, the central opening of the washer being slightly larger in diameter than the support $d^2$ that it may turn freely with relation thereto and prevent the contact of the roller with the support.

My invention is intended to include within its scope the guarding against contact of the metallic ends of a bearing-roller with other metal parts of the bearing by the employment of antifriction-washers.

The supports hereinbefore referred to form guiding means for the bearing-rollers as they revolve in the cage.

The shaft or journal A is herein but partially shown, and it will be understood that when my invention is mounted for practical use the journal or shaft will have applied to it at proper distances apart, according to the length of the box, some usual or suitable collar to limit endwise motion of the journal or shaft with relation to the box, and I may and shall employ any usual or suitable end-thrust means commonly employed to reduce the friction of so-called "end thrust" between a journal or shaft and its box; but inasmuch as said collar and end-thrust means form no part of this invention I have not herein considered it necessary or essential to illustrate the same; but in practice should the journal or shaft be a mill-shaft already in place and with which it is desired to employ my improved traveling alining-cage, then for the best and quickest results the collar and end-thrust means will be so formed in pieces that it may be readily applied to the shaft, and so, also, the roller-bearing cage may be divided into sections—as, for instance, as provided in my application, Serial No. 739,086, filed on the 4th day of December, A. D. 1899.

The supports or spindles may be fixed in the end walls of the cage in any usual or suitable manner.

In the modification Fig. 5 I have shown a bearing-roller having thinner walls. Such a roller may be composed by the employment of heavy tubing, and the ends of the tube are provided with antifriction-bearing members represented as blocks of non-metallic material, such as vulcanite inserted in the open ends of the rollers, the outer ends of the antifriction means occupying a position to contact with the ends of the cage, which occupies a position near the ends of the rollers in running.

In another application, Serial No. 738,774, filed December 1, 1899, I have described and covered by the claims a rigid traveling cage provided with bearing-rollers sustained by antifriction means shown as metallic balls, and the cage in said application is free to slide between the cage-controllers. Herein I employ different antifriction means—namely, washers.

Having described my invention, what I claim as new, and desire to secure by Letters Patent, is—

1. A roller-bearing containing a plurality of bearing-rollers, a cage therefor having extended from its inner walls supports to center and aline said rollers, and antifriction-washers surrounding said supports and interposed between the ends of said rollers and the inner walls of said cage.

2. In a roller-bearing, a plurality of metallic bearing-rollers chambered at their ends, a rigid traveling roller-controlling cage having inwardly extended therefrom roller-supports entering said chambers, and antifriction-washers located at the ends of said rollers and surrounding said supports, said washers preventing the contact of said rollers with said supports.

3. A roller-bearing containing a plurality of bearing-rollers, a rigid traveling alining-cage therefor having extended from its inner walls supports to enter, center and aline said rollers, and antifriction-washers interposed between the ends of said rollers and the inner sides of the cage, said washers preventing contact of the rollers with said supports and also with said cage.

4. A roller-bearing containing a plurality of bearing-rollers chambered at their ends, a rigid traveling alining-cage therefor having extended inwardly from its inner walls supports to enter the chambers of and aline said rollers, and antifriction-washers interposed between the ends of said rollers and the inner sides of said cage, said washers preventing contact of said bearing-rollers with said supports and also with said cage.

5. In a roller-bearing, a rigid traveling alining-cage, a box, and a journal between which said cage is interposed, a plurality of bearing-rollers, a plurality of supports connected with the cage and entering and alining said rollers, and antifriction-washers surrounding said supports and interposed between the ends of the rollers and the inner side walls of the cage, said washers surrounding said supports and preventing the contact of the rollers therewith and with the cage.

6. In a roller-bearing, a rigid traveling alining-cage, a box, and a journal between which said cage is interposed, a plurality of bearing-rollers, a series of supports connected with said cage and entering said rollers, antifriction-washers surrounding said supports and interposed between the ends of the rollers and the inner side walls of the cage, said washers preventing the contact of the rollers with said supports and with the cage, and traveling-cage controllers located outside the ends of said cage and adapted to travel at a faster speed than the cage.

7. In a roller-bearing, a rigid traveling alining-cage, a box and a journal between which said cage is interposed, a plurality of bearing-rollers, a series of supports connected with the cage and entering said rollers, antifriction-washers surrounding said supports and interposed between the ends of the rollers and the inner side walls of the cage, said washers preventing the contact of the rollers with said supports and with the cage, and cage-controllers connected and traveling with said box but at a faster speed than the speed of the cage, and antifriction means interposed between said traveling-cage controller and the ends of the cage.

8. A bearing-roller for use in a roller-bearing, said roller consisting of a metallic body having applied to and contained within its ends antifriction-washers, the washers extending from the ends of the metallic body of the roller.

9. In a roller-bearing, a series of bearing-rollers, a cage having alining means for said rollers, and non-metallic means to prevent contact of said rollers with any part of said cage or its alining means.

10. In a roller-bearing, a cage containing a series of metallic rollers, each roller having fixed to its opposite ends and traveling therewith an antifriction-washer.

11. In a roller-bearing, a cage having a series of metallic bearing-rollers, and means for alining said rollers, each of said rollers presenting at its end an antifriction-washer of a diameter less than that of the bearing-roller and serving to prevent the metallic ends of the roller from contacting with the inner side walls of the cage.

12. In a roller-bearing, a cage containing a series of bearing-rollers chambered at their ends, and means to aline and space said rollers, combined with antifriction-washers contained in said chambers and extended beyond the ends of the rollers.

13. In a roller-bearing, a cage containing a series of rollers having chambers at their ends and antifriction-washers inserted in said chambers and adapted to meet at intervals the inner walls of the cage, said washers preventing the otherwise wear of the rollers and cage by contact.

14. In a roller-bearing, a cage composed of end walls united rigidly by bars to present roller-receiving spaces, roller-alining means projected inwardly from the inner sides of the walls of said cage and located between said bars, a series of bearing-rollers entered by said alining means, and non-metallic antifriction devices interposed between the ends of said bearing-rollers and the inner sides of the end walls of the cage, said antifriction devices meeting the inner sides of said end walls only as the rollers slide longitudinally in said cage.

15. In a roller-bearing, a cage composed of end walls held together by bars to present roller-receiving spaces, a series of bearing-rollers occupying said spaces, spindles supported by said walls and passed through bores at the centers of said bearing-rollers, said bores being of considerably greater diameter than the diameter of said spindles; combined with antifriction-washers located at the ends of said bearing-rollers and surrounding said spindles, said antifriction-washers normally revolving about said spindles and serving to aline or maintain said rollers parallel in said cage.

16. In a roller-bearing, the combination with a cage containing a series of bearing-rollers, of washers interposed between said rollers and said cage, said washers constituting the sole means for keeping said rollers and cage out of contact with each other as set forth.

17. In a roller-bearing, the combination with a cage having bearing-rollers and spindles extended through said rollers, of washers interposed between said rollers and said cage and surrounding said spindles, said washers constituting the sole means for keeping said rollers out of contact with the cage and the spindles.

18. In a roller-bearing, a box, a journal, a traveling cage having a series of bearing-rollers sustained therein and interposed between said box and journal, non-metallic antifriction means at the ends of said rollers to prevent contact between the ends of said rollers and their points of support in said cage.

19. In a roller-bearing, a rotatable box, a fixed journal, a traveling cage having a series of bearing-rollers sustained therein and interposed between said box and journal, non-metallic antifriction means at the ends of said rollers to prevent contact between the ends of said rollers and their points of support in said cage, and traveling-cage controllers which strike said cage only at intervals.

20. In a roller-bearing, a rotatable box, a fixed journal, a traveling cage having a series of bearing-rollers sustained therein and interposed between said box and journal, non-metallic antifriction means at the ends of said rollers to prevent contact between the ends of said rollers and their points of support in said cage, traveling-cage controllers which strike said cage only at intervals, and washers interposed between said cage and controllers.

In testimony whereof I have signed my name to this specification in the presence of two subscribing witnesses.

JULIUS A. PERKINS.

Witnesses:
 GEO. W. GREGORY,
 MARGARET A. DUNN.